Patented Mar. 14, 1944

2,344,429

UNITED STATES PATENT OFFICE 2,344,429

PROCESS OF PURIFYING SULPHURIC ACID SOLUTIONS

Dirk Willem van Gelder, Maasniel, Netherlands; vested in the Alien Property Custodian No Drawing. Application April 3, 1941, Serial No. 386,748. In the Netherlands May 4, 1940

9 Claims. (Cl. 23—172)

It is a known fact that commercial sulphuric acid solutions are often contaminated with iron compounds. This is especially to be regarded as objectionable if these iron compounds show a catalytically decomposing influence on products which are also present in the solution. Thus iron impurity is objectionable in sulphuric acid to be used in the production of hydrogen peroxide.

In the production of hydrogen peroxide by electrolysis of a solution which contains sulphuric acid and ammonium sulphate, followed by a distillation of the hydrogen peroxide from this solution, the difficulty is moreover increased by the fact that the same solution is used in a cyclic process continuously again for electrolysis and distillation, so that the iron compounds accumulate.

Attempts have been made to overcome the difficulty by adding to the liquids, certain substances which would make the iron compounds innocuous (or less harmful) in some way or other.

Thus in the process of the Austrian Patent No. 42,809 cyanides or sulphocyanides are added to the solutions.

In other patent specificatons so called stabilizers are proposed, mostly organic compounds. However, these are not satisfactory in practice, in the above mentioned cyclic process, because they decompose easily at the distillation temperature and in an oxidizing medium.

Further in the Austrian patent specification No. 48,156 a process is described which could be executed also with solutions which are rich in catalysts i. e. rich in iron compounds. In practice it has been shown, however, that also in this case the iron content may not rise above a certain degree, so that it is necessary to renew the solution after some time which results, naturally, in increased cost and in an interruption of the process.

It has also been tried to regenerate the solutions by precipitating the iron with ammonia. This method does not solve the problem because the solutions from which the hydrogen peroxide is prepared usually must have a strong acid reaction, so that great amounts of ammonia must be used, while after filtering out the precipitated iron hydroxide, again more sulphuric acid must be added until the desired acid concentration is reached. In this way too great an amount of solution is obtained and large quantities of chemicals are consumed in the process. Moreover, the filtration of the voluminous iron hydroxide takes much time.

The iron could be precipitated in an acid medium with potassium ferrocyanide, but as the very poisonous hydrocyanic acid is developed thereby, this process usually cannot be applied in practice.

In the British Patent specification No. 476,263 a process is described in which the solutions, before the distillation of the hydrogen peroxide, are brought to crystallization in some manner. The iron compounds would be co-precipitated with the crystallizing salts, so that after filtration the solution would show only a low iron content. However, this process does not give a sufficient result.

An entirely different way is taken in the British patent specification No. 473,342. According to the process therein described, the solutions, after having circulated for a considerable time, are heated to 500° C. in a distillation apparatus of quartz. The sulphuric acid and the ammonia distill over then, though with considerable decomposition. Apart from this last difficulty, the high temperatures and the choice of material for the apparatus make this process unsuitable for commercial practice.

I have now found that sulphuric acid solutions may be purified from iron compounds in a very simple manner by precipitating the iron as a practically insoluble ferric ammonium sulphate compound. To accomplish this, ammonium sulphate must be added to the sulphuric acid solution unless already present therein to a sufficient extent, but in the production of hydrogen peroxide this substance is practically always present.

As may be known the ferric ammonium sulphate when existing as ferric ammonium alum is quite soluble in water, and indeed most of the ferric sulphate compounds are water soluble. However, in a strong sulphuric acid medium the solubility is much smaller. Surprisingly it has been found that by my process, the ferric ammonium sulphate compound, precipitated by concentrating an iron-containing solution of sulphuric acid and ammonium sulphate, is thereby converted into a modification which is also in water or in diluted acid is very difficult to dissolve.

It is possible to free such solutions practically entirely from iron compounds by first concentrating them and thereafter either filtering the solutions as such or filtering the same after diluting the solutions, e. g., with water. In the first case there will be reached, naturally, such a degree of concentration that ammonium sulphate does not also crystallize. It is not necessary to remove the ammonium sulphate, and in the modification here in question it is inadvisable to remove this, except such portion as goes into the formation of the ferric ammonium sulphate compound.

In order to prevent so far as possible losses of active oxygen in the remaining liquid in the production of hydrogen peroxide, the solutions are concentrated, preferably after having gone through the hydrolysis apparatus and before coming again into the electrolyzers. A solution purified in this way from iron, can go through the cyclic process of electrolysis and distillation again many times, before a new purification again becomes necessary. The solubility of the ferric ammonium sulphate compound in the concentrated solution amounts to about 30 mg. Fe per liter. After filtration of the ferric ammonium sulphate, the liquid is diluted again before electrolysis; the iron content in the solution is then so low that the iron does not have any substantially harmful influence on the yield of hydrogen peroxide.

Usually a detrimental influence on the yield only becomes commercially important with an iron concentration of above 100 mg. Fe per liter.

In view of the fact that ammonium salts may decompose at high temperatures, the concentration process is preferably carried out in vacuo.

In the following examples some methods of carrying out the process of the invention are shown, without limiting the invention in any way to the data contained therein.

Example 1

A solution, containing 400 g. sulphuric acid, 200 g. ammonium sulphate and 200 mg. iron (as sulphates) per liter is concentrated in vacuo until the solution contains 1000–1100 g. sulphuric acid per liter. From the liquid (having the consistency of treacle) a white substance separates out in solid state, which is filtered off, or the separation can be accomplished by centrifuging. The filtrate is diluted again to the original sulphuric acid concentration (about 400 g. per liter), and contains then only 18 mg. iron per liter. The liquid is then suitable for use in making hydrogen peroxide by electrolysis and distillation, in a cycle. The electrolysis step is carried out with a sulphuric acid concentration of 400 g. of sulphuric acid per liter.

Example 2

The solution, described in Example 1, after the concentration step, is diluted only until the sulphuric acid concentration amounts to 600 g. of actual sulphuric acid per liter.

The precipitated ferric ammonium sulphate may now easily be filtered off. The filtrate is further diluted until the sulphuric acid concentration amounts to 400 g. sulphuric acid per liter. The solution contains then only 26 mg. Fe per liter.

I claim:

1. A process of purifying sulphuric acid solutions from iron compounds which comprises concentrating sulphuric acid containing iron compounds while containing ammonium sulphate in an amount much more than the amount of said iron compounds, until a large part at least of the iron compounds present are precipitated in the form of ferric ammonium sulfate in a condition substantially insoluble in sulphuric acid, and separating the so precipitated iron compounds.

2. In the cyclic process of making hydrogen peroxide by electrolysis of sulphuric acid solution containing a substantial amount of ammonium sulphate and distillation of hydrogen peroxide therefrom, the herein described process of purifying the sulphuric acid solution containing an iron compound in solution, which comprises separating dissolved iron therefrom in the form of a practically insoluble ferric ammonium sulphate.

3. In the process as set forth in claim 1, the step of performing the concentration step in vacuo.

4. In the process as set forth in claim 1, the step of diluting the concentrated solution before separating the precipitated iron compound.

5. In the cyclic process of making hydrogen peroxide by electrolysis of a solution containing sulphuric acid and distilling hydrogen peroxide from the resulting solution, the herein described process of purifying the sulphuric acid solution when the same contains an undesired amount of iron compound in solution, which comprises concentrating such sulphuric acid containing such iron compound and containing ammonium sulphate in amount much greater than the amount of such iron compound, until there is precipitated a major part at least of the iron compound content of such solution, in the form of a ferric ammonium sulphate which does not readily dissolve in sulphuric acid solution, separating such precipitated material from the solution, and diluting the solution.

6. In the cyclic process of making hydrogen peroxide by electrolysis of a solution containing sulphuric acid and distilling hydrogen peroxide from the resulting solution, the herein described process of purifying the sulphuric acid solution when the same contains an undesired amount of iron compound in solution, which comprises concentrating such sulphuric acid containing such iron compound in solution in vacuo in the presence of ammonium sulphate in amount much greater than the amount of such iron compound, until there is precipitated a major part at least of the iron compound content of such solution, in the form of a ferric ammonium sulphate which does not readily dissolve in sulphuric acid solution nor in water.

7. In the cyclic process of making hydrogen peroxide by the alternate steps of electrolysis of a solution containing sulphuric acid and ammonium sulphate and distilling hydrogen peroxide from such electrolyzed solution, wherein said solution becomes contaminated with iron, the herein described improvement which comprises concentrating the solution after the distillation step, until it reaches a sulphuric acid content of about 1000 to 1100 grams of sulphuric acid per liter, whereby the iron content of such solution becomes precipitated in the form of a white ferric ammonium sulphate which is substantially insoluble in such solution, and separating the main part of such precipitate from such solution, and thereafter diluting such solution to approximately its original concentration, before again subjecting the same to electrolysis.

8. In the cyclic process of making hydrogen peroxide by the alternate steps of electrolysis of a solution containing sulphuric acid and ammonium sulphate and distilling hydrogen peroxide from such electrolyzed solution, wherein said solution becomes contaminated with iron, the herein described improvement which comprises concentrating the solution after the distillation step, until it reaches a sulphuric acid content of about 1000 to 1100 grams of sulphuric acid per liter, whereby the iron content of such solution becomes precipitated in the form of a white ferric ammonium sulphate which is substantially insoluble in such solution and which precipitate will not dissolve to any considerable extent in such solution on dilution by water, adding a substantial volume of water to such concentrate while carrying such precipitate to thin such concentrate to a freely liquid state and then separating the major part at least of such precipitate from the solution, and diluting said solution to approximately its original strength.

9. In the cyclic process of making hydrogen peroxide by the alternate steps of electrolysis of a solution containing sulphuric acid and ammonium sulphate and distilling hydrogen peroxide from such electrolyzed solution, wherein said solution becomes contaminated with iron, the herein described improvement which comprises concentrating the solution in a vacuum, after the distillation step, until it reaches a sulphuric acid content of about 1000 to 1100 grams of sulphuric acid per liter, whereby the iron content of such solution becomes precipitated in the form of a white ferric ammonium sulphate which is substantially insoluble in such solution, and separating the main part of such precipitate from such solution, and thereafter diluting such solution to approximately its original strength.

DIRK WILLEM VAN GELDER.